Oct. 3, 1933.　　　　C. J. WEGNER　　　　1,929,341
BURIAL VAULT CLOSURE
Filed July 21, 1932　　　2 Sheets-Sheet 1

Inventor
C. J. Wegner.
By Lacey & Lacey,
Attorneys

Oct. 3, 1933.  C. J. WEGNER  1,929,341
BURIAL VAULT CLOSURE
Filed July 21, 1932  2 Sheets-Sheet 2
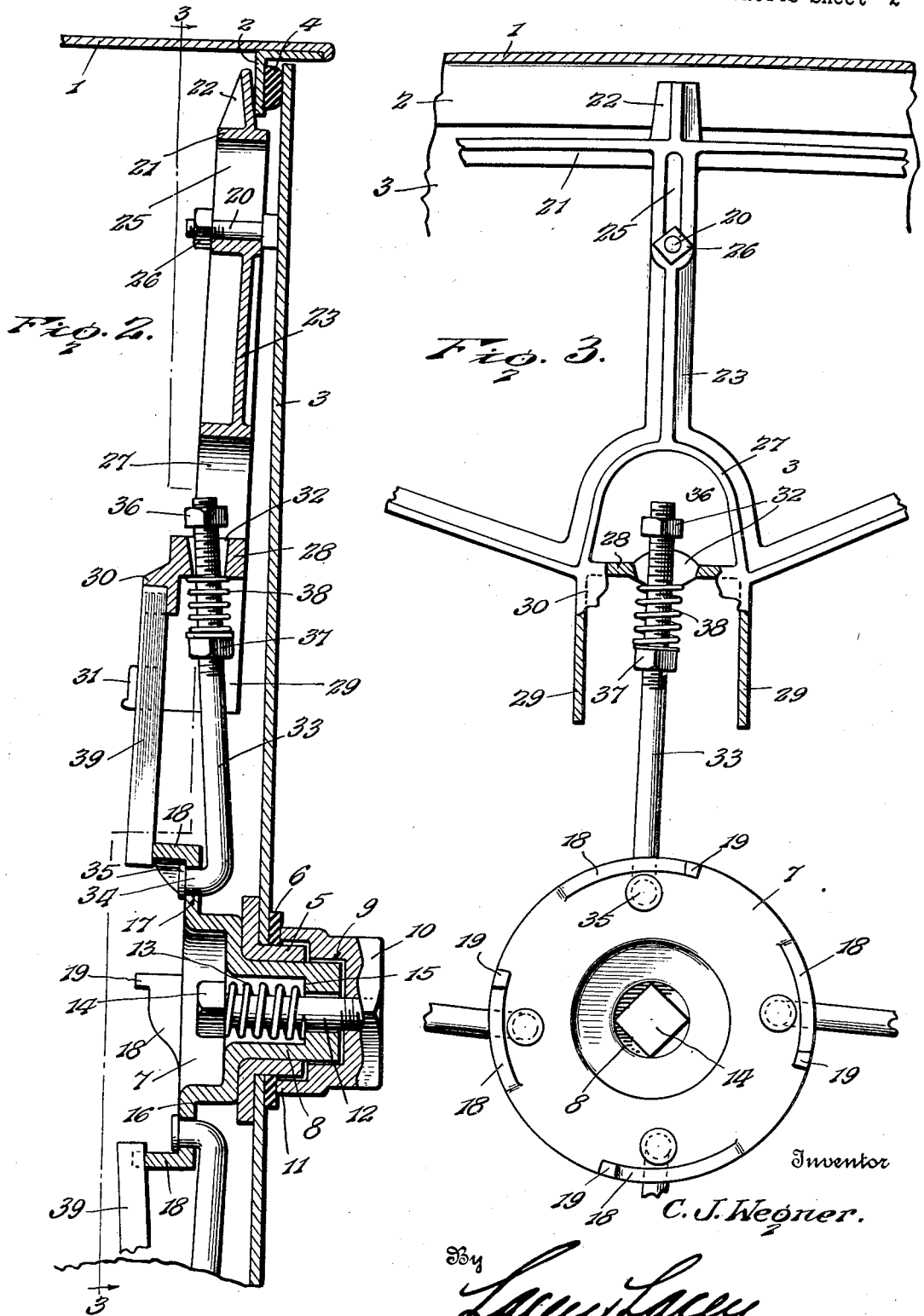

Patented Oct. 3, 1933

1,929,341

UNITED STATES PATENT OFFICE 1,929,341

BURIAL VAULT CLOSURE

Clarence J. Wegner, Galion, Ohio, assignor to Perfection Steel Body Co., Galion, Ohio, a corporation of Ohio Application July 21, 1932. Serial No. 623,884

4 Claims. (Cl. 292—5)

This invention relates to closures for metallic burial vaults and has for its object the provision of means whereby an end door or closure may be quickly secured in place and the joint between the door and the body of the vault effectually sealed in the operation of fastening the door. The invention is illustrated in the accompanying drawings and consists in certain novel features which will be first fully described and then particularly defined in the appended claims.

Figure 1:
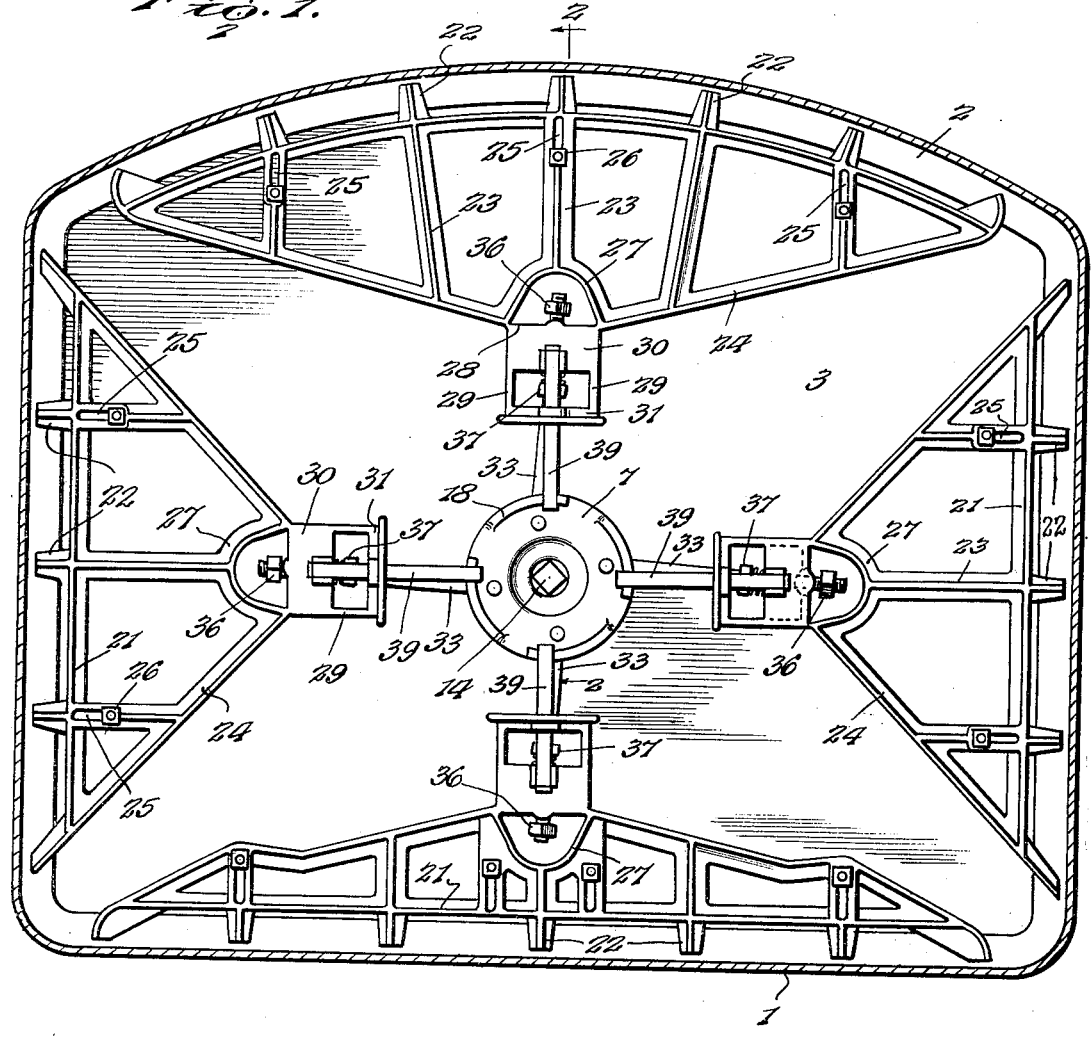
Figure 4:
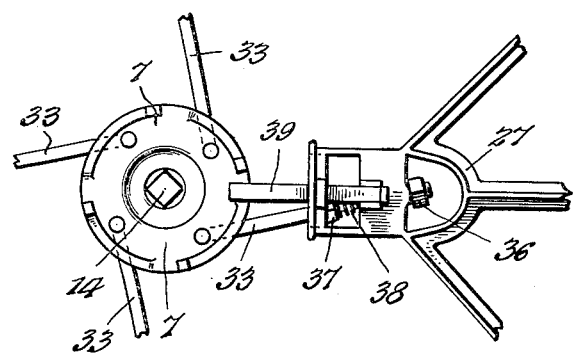

In the drawings, Fig. 1 is an elevation of a door or closure embodying the invention and showing the same in locked position, the body of the vault being shown in transverse section, Fig. 2 is an enlarged section on the line 2—2 of Fig. 1, Fig. 3 is a section on the line 3—3 of Fig. 2, Fig. 4 is a detail elevation of a portion of the locking mechanism showing the released position thereof.

The body of the vault is indicated at 1 and may be of any approved form having one open end, and it is provided at the open end with an internal flange 2 extending around the entire opening and it may be formed by folding the metal of the body but will preferably be formed by welding to the inner surface of the body at the open end an angle iron, as shown in Fig. 2. The door or closure 3 has a contour conforming to the cross sectional contour of the burial vault so that it may fit within the open end of the vault and bear at its margin upon a sealing strip 4 which may be of rubber or any other suitable material and is secured upon the outer face of the flange 2. At the center of the door there is an opening therethrough in which is fitted a bushing or sleeve 5 which constitutes a bearing for the cam wheel which will be presently more fully described. This bushing or sleeve may be, and preferably is, welded to the door so as to be intimately united therewith and around the bushing against the outer face of the door is a gasket 6 which may be compressed so as to seal the opening in which the bushing is fitted. The cam wheel 7 is formed with a hollow hub 8 which extends through and is rotatable in the bearing or bushing 5 and the outer end of the hub projects beyond the bushing and is formed with a non-circular outline so that it may engage within a recess 9 having a mating contour, said recess being formed in a turning block 10. The turning block 10 has a rim 11 which fits around the projecting end of the bushing or bearing 5 and bears at its edge upon the gasket 6 so that when the door is in place and fastened the gasket 6 will be compressed and the joint at the center of the door effectually sealed. The exterior of the head or turning block 10 is suitably shaped to be engaged by a turning tool so that, if a quarter of a turn be given the block, the door will be locked in position and sealed. A bolt 12 is secured at its end centrally in the head or block 10 and extends inwardly through the end of the hub 8 and has its head disposed at the inner end of the hub, as clearly shown in Fig. 2. An expansion spring 13 is coiled around the bolt, between the head 14 thereof and an annular shoulder 15 formed in the hub, so that the head or block 10 will be normally drawn into positive compressing engagement with the gasket 6, as will be understood. The cam wheel 7 has a disk-like portion 16 which is provided with openings 17 therethrough near the margin thereof and at its margin is formed with cam projections 18 which are spaced about the margin of the wheel at intervals corresponding to the intervals between the openings 17, as will be understood upon reference to Figs. 2 and 3. The cam projections are in the form of lugs extending axially from the inner face of the wheel and they, of course, follow the curvature of the margin of the wheel. The outer edges of the projections merge at one end into the face of the wheel and rise gradually therefrom to terminate in a tooth or stop lug 19.

Near the margin of the door there are provided upon the inner face of the same a plurality of studs 20 which may be welded to the door so as to project inwardly therefrom and the free ends of the studs are threaded, as clearly shown in Fig. 2. At the bottom, each side, and the top edge of the door there is provided a locking member consisting of a yoke 21 from which extend lugs 22 which are adapted to project over and bear upon the flange 2, as shown in Fig. 2 and as will be presently more particularly mentioned. Each yoke conforms to the outline of that portion of the door upon which it is mounted and formed integral with the yoke and extending inwardly therefrom are a plurality of arms 23 which are connected at their inner ends by an inner yoke or brace bar 24, as shown. The center arm 23 and the end arms are formed near their outer ends with longitudinal slots 25 through which the studs 20 pass and fitted upon the inner ends of the studs are nuts 26 which bear upon the respective arms so as to retain the yoke in operative relation to the door. The base bars or braces 24 extend from the ends of the yoke inwardly to merge into a connecting arch 27 at the inner end of the central arm 23. Extending between the ends of the arch 27 is a cross bar 28 and extending inwardly from the cross bar is a hood comprising side members 29 and plates or bars 30 and 31 formed integral with and extending between the inner edges of said side members. The cross bar 28 is formed centrally with a flared opening 32 therethrough which receives the outer threaded end of a link 33, the inner end of which is turned, as shown at 34, and pivotally engaged in an opening 17 of the cam wheel 7. The end 34 of the link is upset or formed with a head 35 which covers the opening 17 and thereby prevents withdrawal of the link through the opening. Mounted upon the threaded end of the link, at the outer side of the bar 28, is a nut 36 which forms a stop to prevent the link being withdrawn through the opening 32 and at the inner side of said cross bar 28 the link is provided with a second nut or abutment 37 between which and the cross bar an expansion spring 38 is coiled around the link. It will thus be seen that while there is some lost motion between the link and the yoke or locking element, there will be sufficient push or pull exerted upon the locking member when the cam wheel is rotated to shift the locking member bodily inwardly or outwardly so as to release or secure the door. Welded or otherwise permanently secured to the cross bar 30 is a tilting arm 39 which extends inwardly from said cross bar and has its inner free end resting upon the cooperating cam 18.

It will now be understood that when the vault is to be closed and sealed, the cam wheel is turned so that the free ends of the tilting arms 39 will be adjacent the lower ends of the respective cams and the links 33 will have been drawn inwardly so that the parts will be in the positions shown in Fig. 4 and the locking members or yokes will be drawn inwardly so that the lugs 22 thereon may clear the flange 2 of the vault. The door is then placed in position in the end of the vault with the margin of the door resting against the packing or sealing strip 4, whereupon a turning tool is applied to the turning head or block 10 and a quarter of a revolution is imparted thereto. This movement will be transmitted directly to the hub 8 so that the cam wheel 7 will be likewise turned and the links 33 moved outwardly. Simultaneously with the outward movement of the links 33, the ends of the arms 39 will ride upwardly on the cams 18 and, consequently, will rock the several locking members upon the retaining studs 20 so that the lugs 22 will be caused to rock upon the flange 2 as a fulcrum and draw the door firmly against the packing strip 4 to compress the same and effectually seal the vault. Upon reference to Figs. 1 and 4, it will be noted that the inner ends of the several links 33 will move in arcs concentric with the center of the hub 8 and the bolt 12 and in a plane parallel with the inner face of the door so that, when the wheel is rocked in one direction, the outer ends of the links will be moved inwardly and this movement will be transmitted to the locking members through the nuts 26 and the bars 28. It will also be noted that the outer ends of the links must travel upon radii of the cam wheel inasmuch as the locking members can only move upon right lines defined by the studs 20 and the slots 25 so that the inner ends of the links rock relative to the locking members and this rocking movement is accommodated by the flared formation of the openings 32. When the cam wheel is moved in the opposite direction, the outer ends of the links move outwardly so that the springs 38 will be compressed and the movement of the links will be transmitted through the nuts 37 and the springs to the bars 28 and the locking members, and said members will be moved outwardly so that the lugs 22 will be projected over the flange 2 of the vault.

The springs 38 serve to exert a uniform or equal pressure on all of the locking yokes 21 with the result that should the gasket 4 be uneven or of irregular thickness, the springs will operate to force each locking yoke individually according to the pressure required to seal each individual side of the vault. It will also be noted that the stop lugs 19 on the cam wheel 7 are so located that when the door is in locked position the compression rods or links 33 will be moved to a position slightly past center so as to render it impossible for the door to open without manually rotating the turning block or head 10 with a suitable operating tool.

From the foregoing description, taken in connection with the accompanying drawings, it will be seen that I have provided a very simple, compact and inexpensive structure which may be readily applied to the closure of a burial vault and which may be very easily manipulated to effectually seal the vault. Should it be necessary at any time to obtain access to the interior of the vault, it is necessary merely to apply a turning tool to the head or turning block 10 and give the same a quarter of a turn in the proper direction. The working mechanism is all at the inner side of the door or so mounted as to be entirely concealed and protected against possible chance blows which might break or damage the parts so as to make them inoperative and render removal of the door a difficult operation.

Having thus described the invention, I claim:

1. Locking mechanism for a burial vault door comprising locking members slidably mounted on the inner side of the door and provided at their outer margins with lugs, a cam wheel rotatably mounted upon the door, links pivoted at their inner ends to the cam wheel and having lost motion connections at their outer ends with the locking members, cam projections upon the inner face of the cam wheel, and tilting arms rigidly united with the respective locking members and having their inner free ends bearing upon said cam projections whereby a rocking movement will be imparted to the locking members as the latter are moved outwardly.

2. Locking mechanism for a burial vault door comprising locking members slidably mounted on the inner face of the door, a wheel journaled in the door, links pivoted at their inner ends to said wheel and having a rocking lost motion connection with the locking members at the outer ends of said links, and means whereby the wheel may be turned.

3. Locking mechanism for a burial vault door comprising locking members slidably mounted upon the inner side of the door and each having a cross bar provided with a flared opening therethrough, a wheel journaled in the door, links pivoted at their inner ends to said wheel and having their outer ends extending through the flared openings in the locking members, abutments on the links at the inner and outer sides of the portion of the locking members having the flared openings, and expansion springs mounted upon the links between the inner abutments thereon and the locking members.

4. Locking mechanism for a burial vault door comprising locking members slidably mounted on the inner side of the door, a wheel having a hollow hub journaled in and extending through the door, links pivoted at their inner ends to the wheel and having lost motion connections with the locking members at their outer ends, packing about the hub of the wheel against the outer side of the door, a turning block housing the outer extremity of the hub of the wheel and engaged therewith so that the wheel will turn with the turning member, a bolt secured in the turning member and extending through the outer end of the wheel hub and provided with a head at its inner end, and an expansion spring fitted within the hub about said bolt between the head of the bolt and the end of the hub whereby to hold the turning member in compressing engagement with the packing.

CLARENCE J. WEGNER. [L. S.]